United States Patent [19]

Sudo et al.

[11] Patent Number: 4,644,205
[45] Date of Patent: Feb. 17, 1987

[54] POSITIONING DEVICE OF MAGNETIC SUSPENSION TYPE

[75] Inventors: Hajime Sudo, Kawasaki; Hiroshi Takahashi, Tokyo, both of Japan

[73] Assignee: Kabushiki Kaisha Toshiba, Kawasaki, Japan

[21] Appl. No.: 780,599

[22] Filed: Sep. 26, 1985

[30] Foreign Application Priority Data

Sep. 29, 1984 [JP] Japan .................................. 59-204850

[51] Int. Cl.[4] ............................................. F16C 39/06
[52] U.S. Cl. .................................................... 310/90.5
[58] Field of Search .......................... 308/10; 310/90.5

[56] References Cited

U.S. PATENT DOCUMENTS

| 3,845,995 | 11/1974 | Wehde | 308/10 |
| 3,888,553 | 6/1975 | Wehde | 308/10 |
| 4,088,018 | 5/1978 | Anderson et al. | |
| 4,114,960 | 9/1978 | Habermann | 308/10 |
| 4,355,313 | 10/1982 | Hubert | |
| 4,470,644 | 9/1984 | Weisser | 308/10 |
| 4,483,570 | 11/1984 | Inoue | 308/10 |
| 4,563,046 | 1/1986 | Shimamoto | 308/10 |

FOREIGN PATENT DOCUMENTS

| 0136865 | 4/1985 | European Pat. Off. | 308/10 |
| 2213465 | 10/1973 | Fed. Rep. of Germany | 308/10 |
| 0099947 | 6/1984 | Japan | 308/10 |
| 1030508 | 5/1966 | United Kingdom | 308/10 |

OTHER PUBLICATIONS

A Collection of Technical Papers of AIAA Guidance and Control Conference; 1984.

Primary Examiner—R. Skudy
Attorney, Agent, or Firm—Oblon, Fisher, Spivak, McClelland & Maier

[57] ABSTRACT

A positioning device of magnetic suspension type is disclosed, which comprises a cylindrical stationary member and a cylindrical floating member arranged coaxially with the stationary member. The floating member is supported in non-contact state with respect to the stationary member by the magnetic forces produced by a plurality of magnetic circuits. The device further includes at least one control coil disposed such that it crosses the flux passing through the magnetic circuit. When the control coil is energized, it receives an electromagnetic force for displacing the floating member in co-operation with the flux from the magnetic circuit.

12 Claims, 11 Drawing Figures

POSITIONING DEVICE OF MAGNETIC SUSPENSION TYPE

BACKGROUND OF THE INVENTION

This invention relates to a positioning device for supporting an object by magnetic forces without contacting the object, and positioning the object by controlling the magnetic forces.

A mechanical positioning device is known which can accurately position an object, using a ball screw. The ball screw is rotated, thus moving the base on which the object is mounted. The object is therefore positioned in accordance with the rotational angle of the ball screw. To accurately position the object the ball screw must be machined with high precision. However, since is a limitation to the precision of the screw, it is difficult to obtain highly accurate positioning of the object. Maintenance and inspection must be periodrically made on the mechanical positioning device to maintain the positioning accuracy for years. It is improper to incorporate such a mechanical positioning device into an apparatus which cannot be inspected for a long time.

A positioning device utilizing an electromagnet has been proposed to replace the mechanical positioning device. This new device has a base on which an object is mounted. The base is supported and moved in non-contact state by magnetic force generated by the electromagnet thus positioning the object. The magnetic force is controlled to position the object. The magnetic force necessary for supporting the base at a predetermined position is inversely proportional to the square of the distance between the electromagnet and base. Therefore, in order to move the base, and, thus, the object, to a predetermined position, the non-linear magnetic forces generated by the electromagnet must be linearized. In other words, it is necessary to convert a current supplied to the electromagnet into a non-linear current. Therefore, an electric circuit including not only the electromagnet, thus but also a device for such current conversion must be utilized. The use of such a complicated circuit inevitably reduces the reliability of the positioning device.

SUMMARY OF THE INVENTION

An object of the invention is to provide a positioning device of magnetic suspension type, which has a simple structure and can accurately position an object.

To attain the above object of the invention, there is provided a positioning device of magnetic suspension type, comprising:

a stationary member;

a movable member to be disposed in non-contact state to said stationary member;

magnetic support means including at least one magnetic circuit for supporting said movable member in non-contact state with respect to said stationary member by using the magnetic forces generated by said magnetic circuit;

detecting means for detecting the position of said movable member relative to said stationary member and producing a signal representing the detected position of said movable member; and driving means for generating a drive force for moving and positioning said movable member relative to said stationary member, said driving means including at least one conductive member disposed to cross the magnetic fluxes flowed in the magnetic circuit, and applying means for applying an electromagnetic force to the conductive member by flowing current to said conductive member in accordance with a signal from said detecting means.

The movable member is supported with respect to the stationary member in non-contact state. The electromagnetic force for displacing the movable member can be produced by the interaction between the current supplied to the conductive member and flux of the magnetic circuit independently of the magnetic forces of magnetic support means. Further, since the magnitude of the electromagnetic force is proportional to the magnitude of the current supplied to the conductive member, the movable member can readily be positioned with respect to the stationary member by controlling the magnitude of the current.

DETAILED DESCRIPTION OF THE PREFERRED EMBODIMENTS

Figure 1:
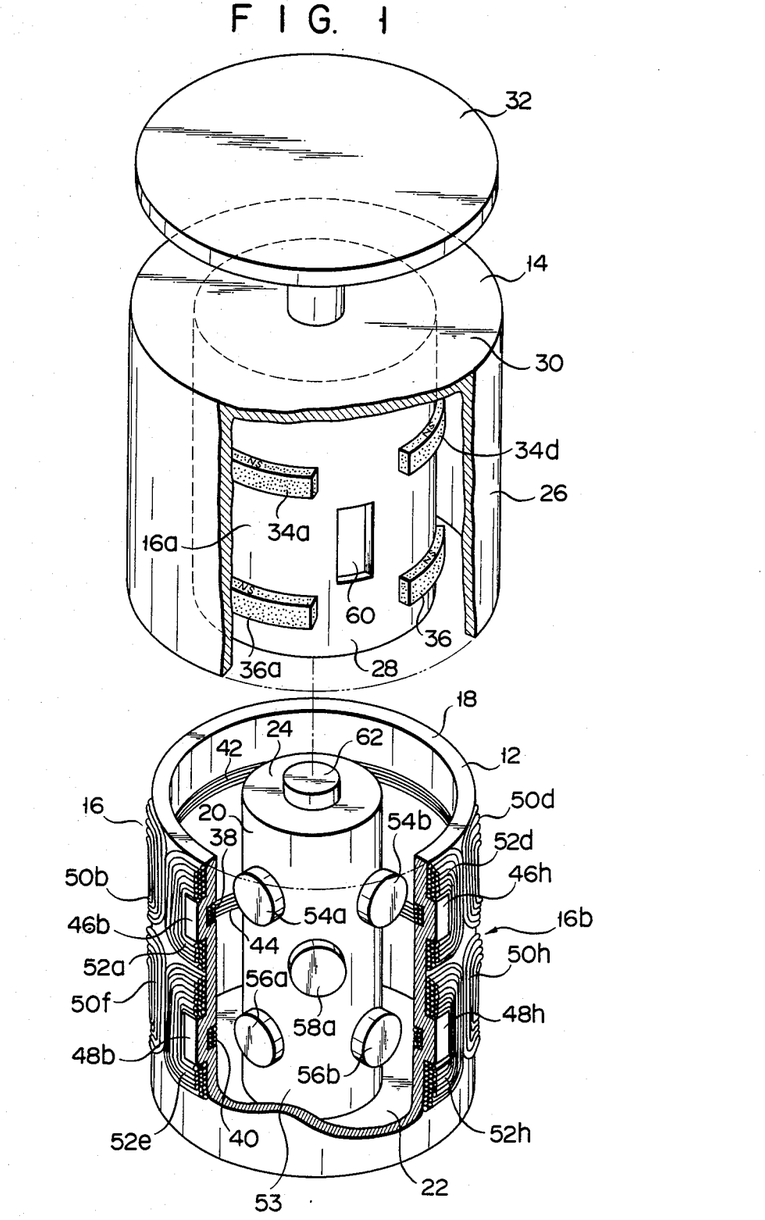
FIG. 1 is an exploded perspective view showing a first embodiment of the positioning device according to the invention.
Figure 2:
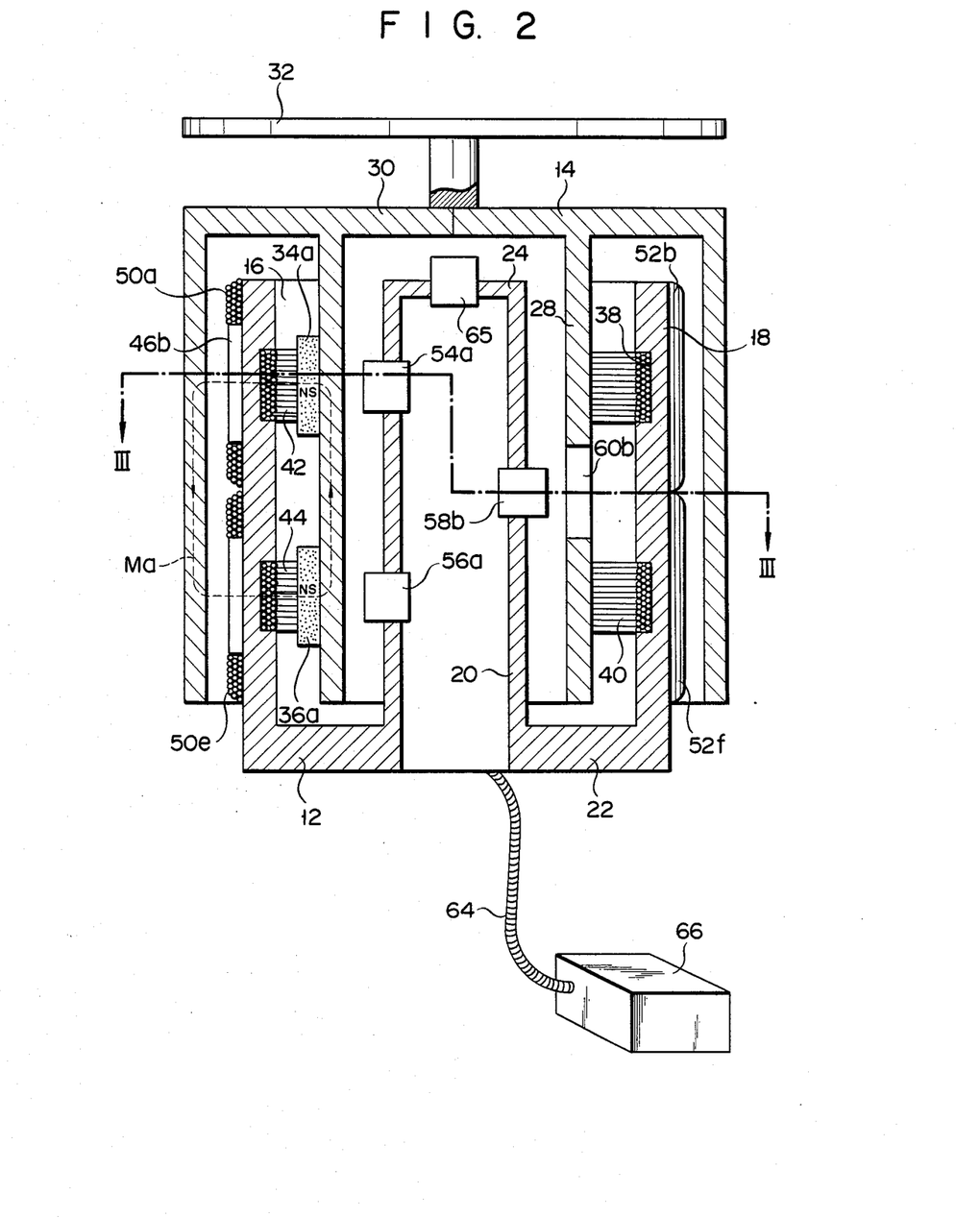
FIG. 2 is a sectional view taken along line II—II in FIG. 3.
Figure 3:
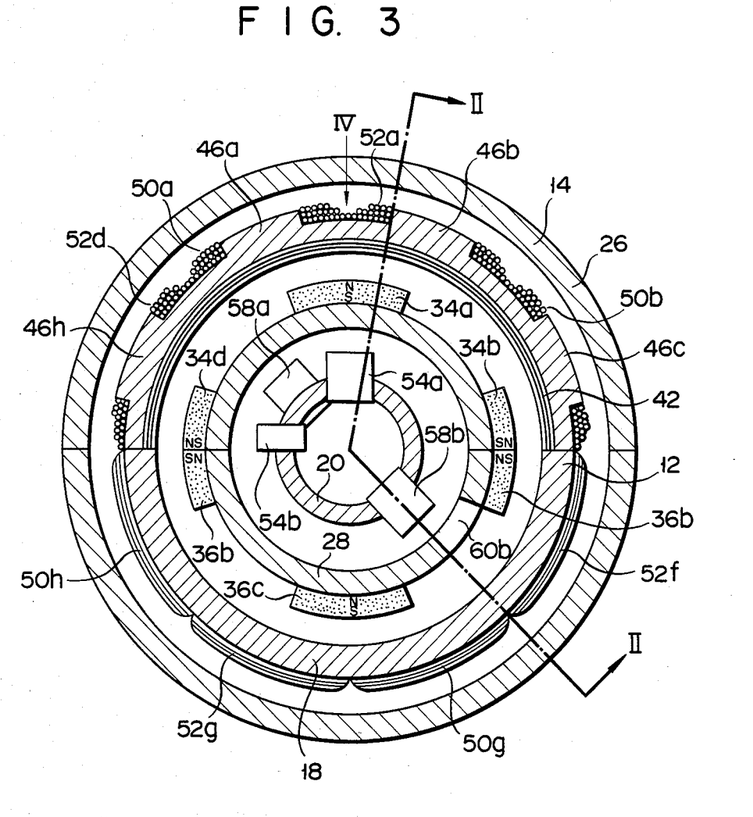
FIG. 3 is a sectional view taken along line III—III in FIG. 2.

Referring to FIGS. 1 to 3, there are shown a first embodiment of the positioning device according to the invention. The illustrated positioning device comprises a stationary member 12, a floating member 14 and position control means 16 for positioning a floating member 14.

The stationary member 12 made from of a nonmagnetic material has a hollow outer cylinder 18, an inner hollow cylinder 20 coaxial with the outer cylinder 18, an annular end wall 22 coupling together the lower ends of the inner and outer cylinders 20 and 18 and an end wall 24 closing the upper end of the inner cylinder 20.

The floating member 14 is made from a silicon steel having a high magnetic permeability and serving as an electromagnetic shield. The floating member 14 has a hollow outer cylinder 26, a hollow inner cylinder 28 coaxial with the outer cylinder 26 and an end wall 30 closing the upper ends of the inner and outer cylinders 28 and 30. The outer cylinder 26 of the floating member 14 has an inner diameter greater than the outer diameter of the outer cylinder 18 of the stationary member 12. The inner cylinder 28 of the floating member 14 has outer and inner diameters such that it can be inserted in an annular space defined between the outer and inner cylinders 18 and 20 of the stationary member 12. The floating member 14 can be fitted on the stationary member 12 in non-contact state thereto, as shown in FIGS. 2 and 3. A mounting flange 32 is secured by means of a shaft to the end wall 30 of the floating member 14. An object (not shown) to be positioned is mounted on the mounting flange 32. The mounting flange 32 is shown only in FIGS. 1 and 2.

The position control means 16 comprises of magnetic force generating means 16a and driving means 16b. The generating means 16a includes a plurality of permanent magnets as flux generation elements. More particularly, the generating means 16a includes four, arcular permanent magnets 34a to 34d provided at a uniform circumferential spacing on an upper portion of the outer periphery of the inner cylinder 28 of the floating member 14. The means 16a further includes other four arcular permanent magnets 36a to 36d provided at a uniform circumferential spacing on a lower portion of the outer periphery of the inner cylinder 28 such that they correspond to the respective permanent magnets 34a to 34d with respect to circumferential positions. The permanent magnets 34a to 34d are magnetized in the opposite direction to the permanent magnets 36a to 36d.

The driving means 16b will now be described. The inner periphery of the outer cylinder 18 of the stationary member 12 has upper and lower annular grooves 38 and 40 formed in the circumferential direction. The center-to-center distance between the grooves 38 and 40 is equal to the center-to-center distance between the permanent magnets 34a to 34d and permanent magnets 36a to 36d. Axial direction control coils 42 and 44 which are wound in the circumferential direction are accommodated in the grooves 38 and 40. The outer periphery of the outer cylinder 18 of the stationary member 12 has eight upper projections 46a to 46h and eight lower projections 48a to 48h, these projections being spaced apart in the circumferential direction. These projections 46a to 46h and 48a to 48h are disposed at positions such that they corresponds to circumferential ends of the permanent magnets 34a to 34d and 36a to 36d when the stationary member 12 is fitted on the floating member 14. In the Figures, the projections 48a to 48h are shown only partly.

Among the projections 46a to 46h and 48a to 48h, the projections 46a, 46c, 46e, 46g, 48a, 48c, 48e and 48g are provided with radial direction control coils 50a to 50h. The remaining projections 46b, 46d, 46f, 46h, 48b, 48d, 48f and 48h are provided with circumferential direction control coils 52a to 52h.

Figure 4:
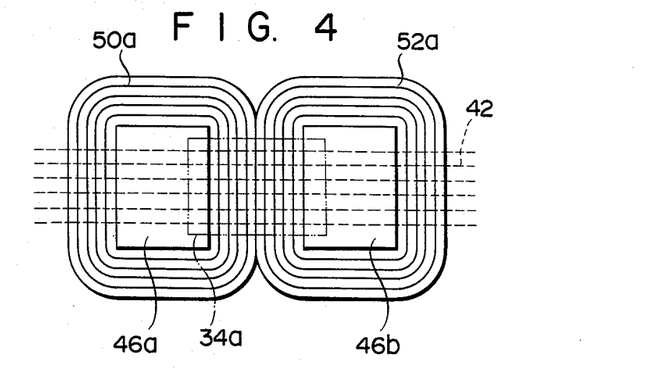
FIG. 4 is a view taken in the direction of arrow IV in FIG. 3.

The positional relationship among the axial direction control coils 42 and 44, radial direction control coils 50a to 50h, circumferential direction control coils 52a to 52h and permanent magnets 34a to 34d and 36a to 36h when the floating member 14 is fitted on the stationary member 12 is as shown in FIG. 4. FIG. 4 represents the positional relationship among the axial direction controls 42, radial direction control coils 50a, circumferential direction control coils 52a and permanent magnets 34a. As is obvious from FIG. 4, the magnetic flux generated from the permanent magnet 34a penetrates the axial direction control coils 42 and penetrates portions of the radial direction control coil 50a and circumferential direction control coil 52a which are adjacent to each other and extend in the axial direction.

Now, position detection means 53 for detecting the position of the floating member 14 relative to the stationary member 12 will be described. Two pairs radial position detectors 54a, 54b and 56a, 56b are respectively provided on upper and lower portions of the outer periphery of the inner cylinder 20 of the stationary member 12 such that the pair position detectors circumferentially spaced apart by 90°. Each of radial position detectors 54a, 54b, 56a, 56b consists of eddy current type distance sensor and can measure the distance of the floating member 14 up to the inner periphery of the inner cylinder 28. Circumferential position detectors 58a and 58b are mounted on the outer periphery of the inner cylinder 20 of the stationary member 12 at the center position of a region defined by the radial position detectors 54a, 54b, 56a, 56b and at a diametrically opposite position to this position, respectively. The inner cylinder 28 of the floating member 14 has axially extending windows 60a and 60b which are located at positions corresponding to the circumferential position detectors 58a and 58b when the floating member 14 is fitted on the stationary member 12. Each of circumferential position detectors 58a and 58b consists eddy current type sensor like the radial position detectors 54a, 54a, 56a and 56b. These circumferential position detectors 58a and 58b detect the circumferential position of the floating member 14 by detecting the variation of the area of the windows 60a and 60b facing them when the floating member 14 is fitted on the stationary member 12. An axial position detector 62 similar to the radial position detectors is mounted on the end wall 24 of the inner cylinder 20 of the stationary member 12. The axial position detector 62 can measure the distance to the inner surface of the end wall 30 of the floating member 14 when the floating member 14 is fitted on the stationary member 12.

The detectors and control coils noted above are electrically connected to a drive unit 66 through an electric code as shown in FIG. 2. The drive unit 66 controls the energization of the control coils according to signals from the detectors.

The operation of the first embodiment of the positioning device will now be described.

When the floating member 14 is fitted on the stationary member 12, as shown in FIG. 2 four magnetic circuits Ma to Md (only circuit Ma is shown for clarity) are defined between the stationary member 12 and floating member 14. The fluxes from the pair permanent magnets 34a and 36a among the permanent magnets 34a to 34d and 36a to 36d pass through the magnetic circuit Ma, which extends from the permanent magnet 34a, axial direction control coil 42, outer cylinder 18 of the stationary member 12, axially adjacent portions of the radial direction control coil 50a and circumferential direction control coil 52a, outer cylinder 26 of the floating member 14, axially adjacent portions of the radial direction control coil 50e and circumferential direction control coil 52e, outer cylinder 18 of the stationary member 12, axial direction control coil 42, permanent magnet 36a, inner cylinder 28 of the floating member 14 and back to the permanent magnet 34a. The remaining pairs of permanent magnets 34b and 36b, 34c and 36c and 34d and 36d define the respective magnetic circuits Mb to Md like the pair of permanent magnets 34a and 36a. The floating member 14 is held with respect to the stationary member 12 in non-contact state thereto by the magnetic forces of the magnetic circuits Ma to Md acting between the stationary member and floating member 14.

When current is flowed in each coil with the floating member 14 supported with respect to the stationary member 12 in non-contact state thereto, each coil receives an electromagnetic force which is proportional to the length of its portion crossing the magnetic flux of the magnetic circuit M and the current flowed in it. The direction of this electromagnetic force is determined by the Fleming's rule. When the electromagnetic force acts on each coil, however, the coil is not moved because the coil is secured to the stationary member 12. Therefore, the reaction force to the electromagnetic force acting on the control coil acts on the floating member 14. As a result, the floating member 14 is moved by the reaction force of the electromagnetic force.

Figure 5:
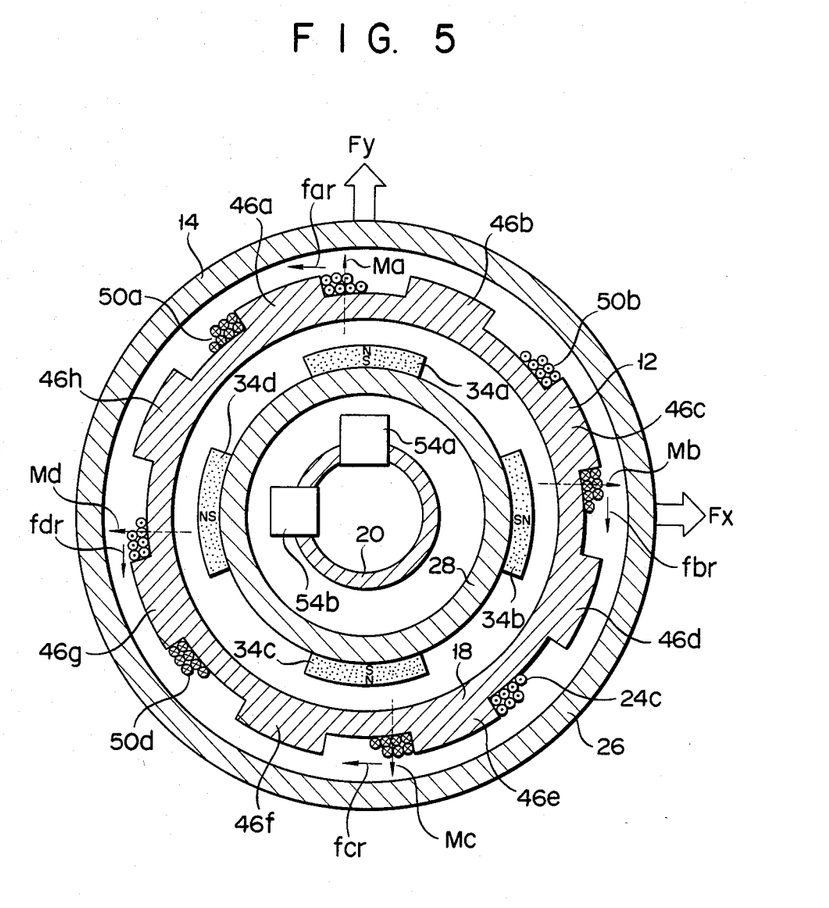
FIGS. 5 to 7 illustrate the operation of the positioning device shown in FIG. 1.
Figure 6:
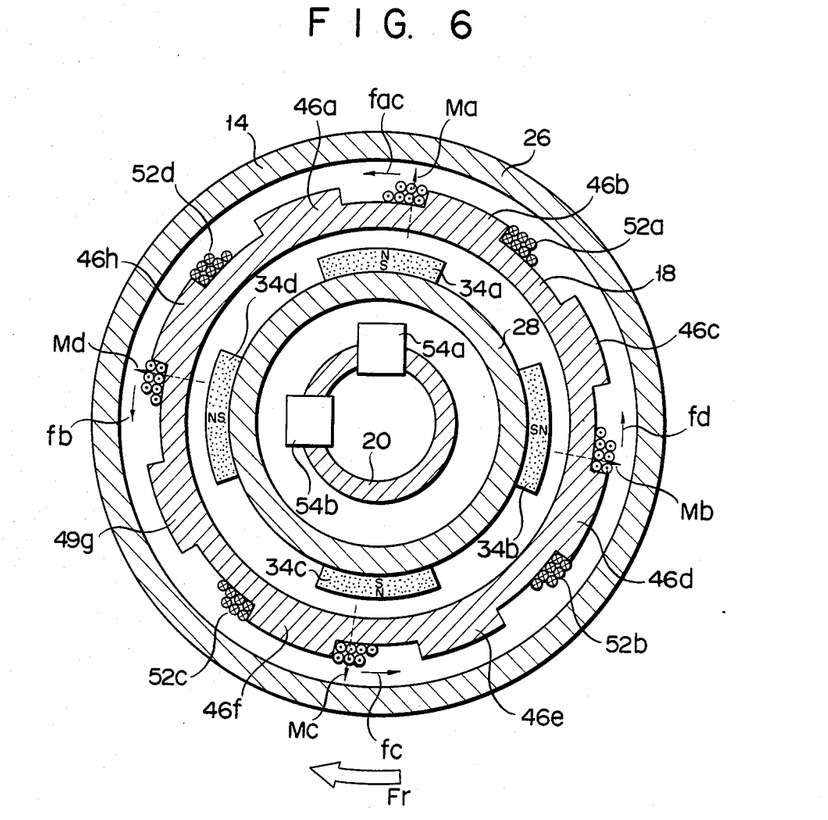
Figure 7:
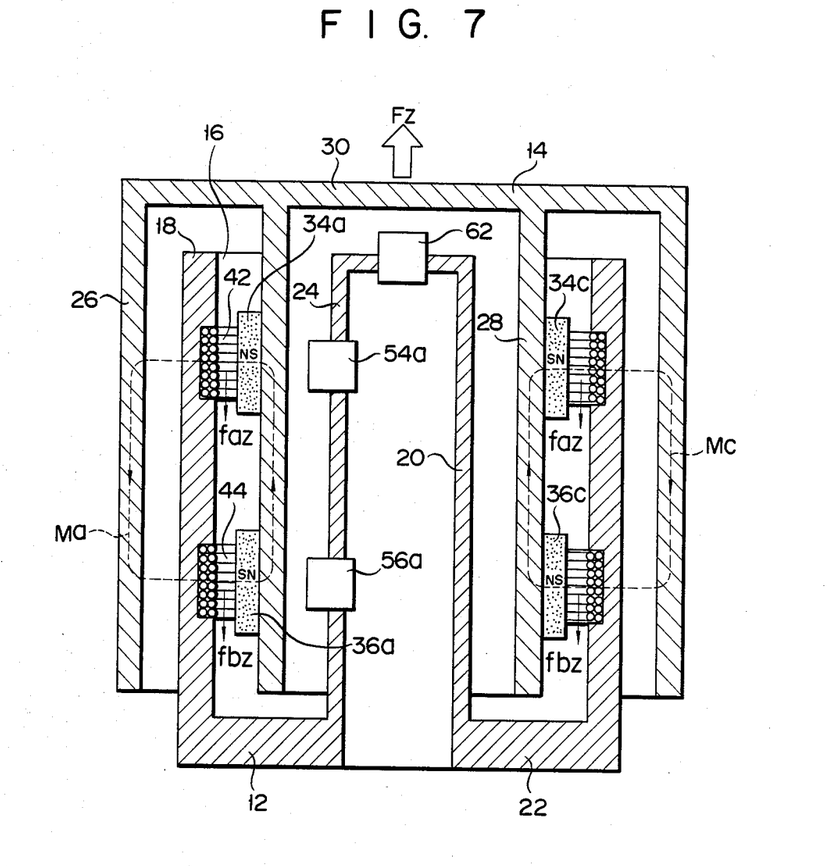

While the operational principles of the positioning device according to the invention is as described above, the operation of positioning of the floating member 14 will now be described with reference to FIGS. 5 to 7. In FIGS. 5 to 7, members which are irrelevant to the explanation are omitted.

The process of positioning the floating member 14 in the radial direction will be explaining with reference to FIG. 5. When displacing the floating member 14 in the radial direction as shown by arrow Fx in FIG. 5, axially upward current is flowed in axial portions of the radial position control coils 54a to 50e crossing the flux of the magnetic circuit Ma, and axially downward current is flowed in axial portions of the radial position control coils 50c and 50g crossing the flux of the magnetic circuit Mc. As a result, electromagnetic forces fac and fcr in the direction of arrows in FIG. 5 act on the axial portions of the radial direction control coils 50a and 50e and the axial portions of the radial position coils 50c and 50g. The floating member 14 thus receives a reaction force Fx opposite to the direction of the electromagnetic forces fac and fcr, so that the floating member 14 is displaced in the radial direction as shown by the reaction force Fx. As a result, the positioning of the floating member 14 in the radial direction as shown by the reaction force Fx can be done by control of the magnitude of the electromagnetic forces fac and fcr. When the direction of current flowed in the radial direction control coils 50a, 50e, 50c and 50d is reversed electromagnetic forces opposite to the electromagnetic forces far and fcr act on the radial direction control coils 50a and 50c and radial direction control coils 50e and 50g. Thus, positioning of the floating member 14 thus can be done in the radial direction opposite to the radial direction shown by the reaction force Fx.

When displacing the floating member 14 in the radial direction shown by arrow Fy in FIG. 5, axially upward current is flowed in the axial portions of the radial position control coils 50b and 50f crossing the flux of the magnetic circuit Mb, and axially downward current is flowed in the axial portions of the radial direction control coils 50d and 50h crossing the flux of the magnetic circuit Md. Thus, electromagnetic forces fbr in the directions of arrows in FIG. 5 act on the axial portions of the radial direction control coils 50d to 50h and axial portions of the radial direction control coils 50d to 50h. The floating member 14 thus receives a reaction force Fy of the opposite to the electromagnetic forces fbr. Thus, the positioning of the floating member 14 in the radial direction as shown by the reaction force Fy can be done by control of the magnitude of the electromagnetic forces fbr. Also, by reversing the sense of current flowed in the radial direction control coils 50b, 50f, 50d and 50h the floating member 14 can be displaced in the opposite sense to the radial direction shown by the reaction force Fy. The magnitude of current supplied to the radial direction control coils 50a to 50h can be controlled by the drive unit 66 according to signals from the radial position detectors 54a, 54b, 56a and 56b.

Now, the process of positioning the floating member 14 in the circumferential direction will be described. When rotationally displacing the floating member 14 in the circumferential direction shown by arrow Fr in FIG. 6, axially upward current is flowed in the axial portions of the circumferential position control coils 52a to 52h crossing the fluxes of the magnetic circuits Ma to Md. Thus, counterclockwise electromagnetic forces fac, fbc, fcc and fdc act on the axial portions of the circumferential position control coils 52a to 52h. The floating member 14 thus is rotationally displaced in the clockwise direction by a clockwise reaction force Fr of the opposite sense to the electromagnetic forces fac, fbc, fcc and fdc. The circumferential position of the floating member 14 in the clockwise direction thus can be controlled through control of the magnitude of the electromagnetic forces fac, fbc, fcc and fdc. Thus, by reversing the sense of the current flowed in the circumferential position control coils 52a to 52h a reaction force in the counterclockwise direction may be acted on, whereby the floating member 14 can be positioned circumferentially in the counterclockwise direction. In such circumferential positioning of the floating member 14, the magnitude of current supplied to the circumferential direction control coils 52a to 52h is controlled by the drive unit 66 in accordance with the signals from the circumferential position detectors 58a and 58b.

Lastly, the process of axially positioning the floating member 14 will be described. As is seen from FIG. 7, the axial position control coils 42 and 44 crosses the opposite sense fluxes of the magnetic circuits Ma to Md. In FIG. 7, only the magnetic circuits Ma and Mc are shown. When opposite sense currents are flowed in the axial position control coils 42 and 44, electromagnetic forces of the same sense act on the axial direction control coils 42 and 44 in the axial direction of the floating member 14. For example, when a counterclockwise current when viewed from above FIG. 7 is flowed in the axial position control coil 42 while flowing a clockwise current in the other axial position control coil 44, downward electromagnetic forces faz and fbz as shown by arrows in FIG. 7 act on the axial position control coils 42 and 44. The floating member 14 thus receives an axially upward reaction force Fz in FIG. 7 of the opposite sense to the electromagnetic forces faz and fbz and is thus displaced axially upwardly. The axial positioning of the floating member 14 thus can be done by control of the magnitude of current supplied to the axial position control coils 42 and 44. Further, by reversing the current flowed in the axial position control coils 42 and 44, the floating member 14 receives an axially downward reaction force and is displaced axially downwardly. The magnitude of current flowed in the axial position control coils 42 and 44 is controlled by the drive unit 66 in accordance with the signals from the axial position detector 62.

As has been shown, with the first embodiment of the positioning device the floating member 14 can be supported with respect to the stationary member 12 in non-contact state thereto by electromagnetic forces produced by the magnetic circuits Ma to Md. The radial position, circumferential position and axial position of the floating member 14 can be controlled independently through control of the magnitude of current flowed in the corresponding control coils. According to the invention, the drive force utilized for the individual position controls of the floating member 14, i.e., the electromagnetic force produced by the co-operation of the constant magnetic field produced by the magnetic circuits Ma to Md and current through the respective control coils, is not utilized for the supporting of the floating member 14. Thus the individual position controls of the floating member 14 can be obtained by control of the magnitude of the electromagnetic force independently of the magnitude of the magnetic gap between the stationary member 12 and floating member 14. Further, the magnitude of the electromagnetic force is linearly proportional to the magnitude of the current flowed in each control coil. Thus, it is possible to simplify the construction of the drive unit 66 for controlling the current through the control coils and also obtain highly accurate control of the current flowed in the control coils. In other words, it is possible to effect the individual position controls of the floating member 14 highly accurately.

Further, in the first embodiment of the invention the detectors and control coils are mounted on the stationary member 12, so that the transmission of signal from each detector to the drive unit 66 and supply of current from the drive unit 66 to each control coil can be readily done to simplify the construction of the entire positioning device according to the invention.

Further, in the first embodiment the floating member 14 is made of an electromagnetic shield material and is disposed to cover the stationary member 12, i.e., the entire position control means 16. Therefore, the electromagnetic waves generated from the position control means 16 are shielded by the floating member 12 to eliminate leakage of electromagnetic waves from the positioning device according to the invention to the outside. Thus, the first embodiment of the positioning device may be disposed near an apparatus which is readily susceptible to the influence of the electromagnetic waves.

The first embodiment of the positioning device described above is by no means limitative, and other embodiments will now be described, in which parts like those in the first embodiment are shown by like reference symbols and numerals.

Figure 8:
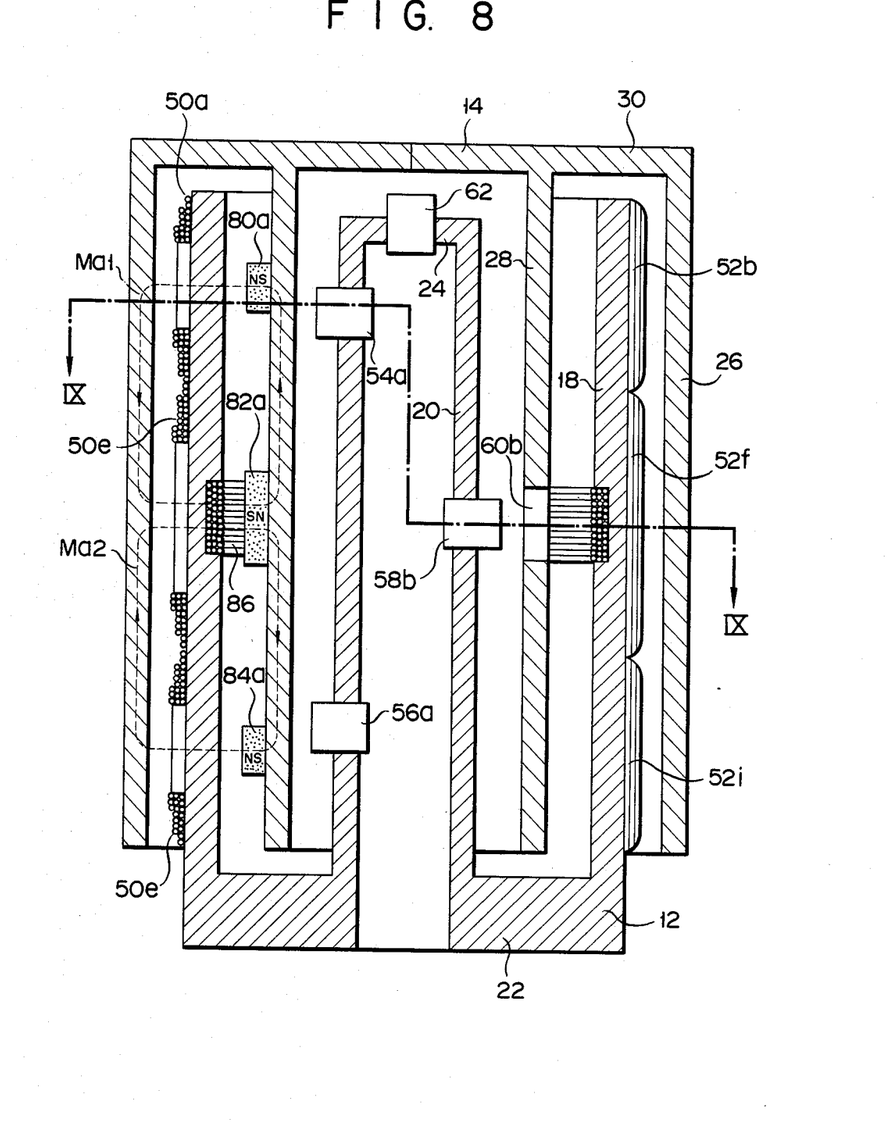
FIG. 8 is a sectional view taken along line VIII—VIII shown in FIG. 9 showing a second embodiment of the positioning device according to the invention.
Figure 9:
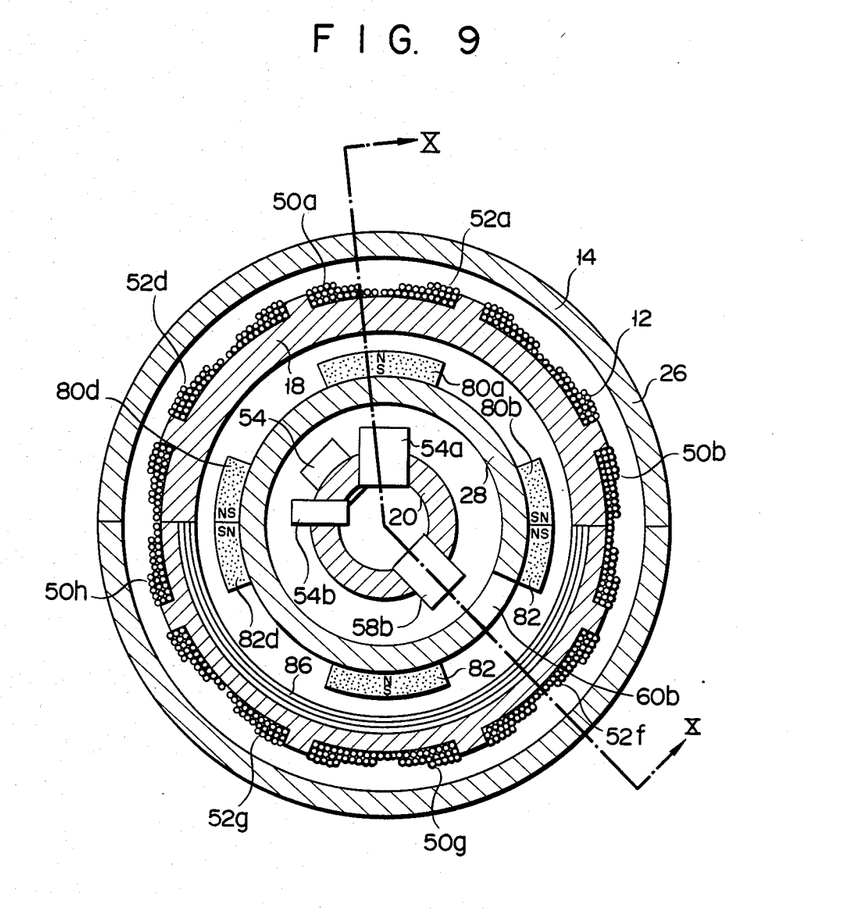
FIG. 9 is a sectional view taken along line IX—IX in FIG. 8.

Referring to FIGS. 8 and 9, a second embodiment of the positioning device according to the invention, is shown. In this case, the outer periphery of the inner cylinder 20 of the stationary member 14 are provided with three rows of permanent magnets 80a to 80d, 82a to 82d and 84a to 84d, these rows being arranged in the axial direction. In this embodiment, a pair of magnetic circuits Ma1 and Ma2, a pair of magnetic circuits Mb1 and Mb2, a pair of magnetic circuits Mc1 and Mc2 and a pair of magnetic circuits Md1 and Md2, correspond to the respective magnetic circuits Ma to Md in the first embodiment. In correspondence to the three rows of permanent magnets 80a to 80d, 82a to 82d and 84a to 84d, the outer periphery of the outer cylinder 18 of the stationary member 12 are provided with twelve radial position control coils 50a to 50l and twelve circumferential position control coils 52a to 52l, these coils being arranged in three rows in the axial direction. In FIGS. 8 and 9, the radial and circumferential direction control coils are shown only partly. In the case of the second embodiment, only a single axial position control coil 86 is provided. As is seen from FIG. 8, the axial position control coil 86 is secured to the inner periphery of the inner cylinder 20 of the stationary member 21 such that it faces the permanent magnets 82a to 82d, through which fluxes of the highest flux density pass.

With the second embodiment of the positioning device described above, in which the permanent magnets are provided on the stationary member 12 in three rows in the axial direction and also the radial and circumferential control coils are also provided in three rows, it is possible to obtain large magnetic forces for supporting the floating member 14 and also large drive forces, i.e., electromagnetic forces, for the individual positioning controls. Thus, even if a large load is applied to the floating member 14, the floating member 14 can be reliably supported with respect to the stationary member 12 in non-contact state thereto, and also the floating member 14 can be readily displaced in each direction.

Figure 10:
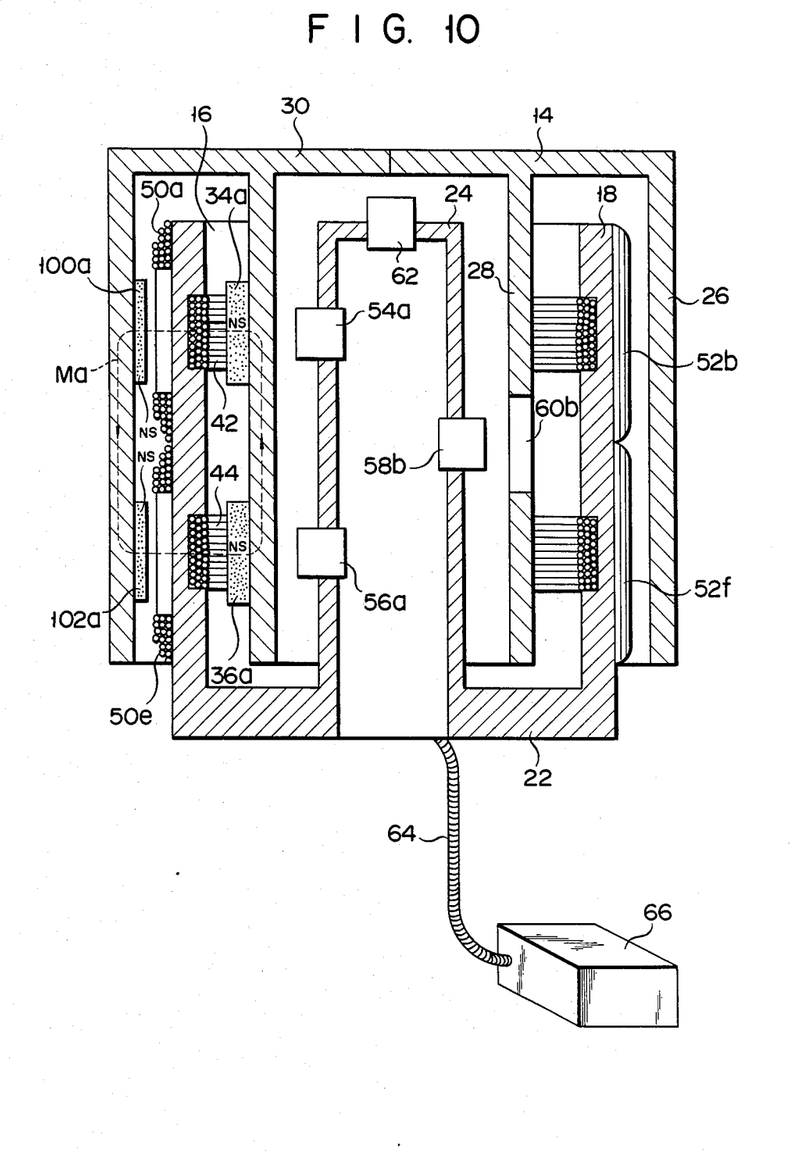
FIG. 10 is a sectional view showing a third embodiment of the positioning device according to the invention.

FIG. 10 shows a third embodiment of the positioning device. This embodiment of the positioning device is substantially the same in structure as the first embodiment. In this embodiment, however, the inner periphery of the outer cylinder 26 of the floating member 14 is also provided with permanent magnets 100a to 100d and 102a to 102d corresponding to the respective permanent magnets 34a to 34d and 36a to 36d. In this embodiment, it is not only possible to satisfactorily eliminate leakage of the fluxes generated from the magnetic circuits Ma to Md to the outside of the floating member 14, but also the magnitude of the fluxes can be increased. Thus, like the case of the second embodiment a large load applied to the floating member 14 can be readily withstood, and also a large drive forces can be generated for the individual positioning controls of the floating member 14.

Figure 11:
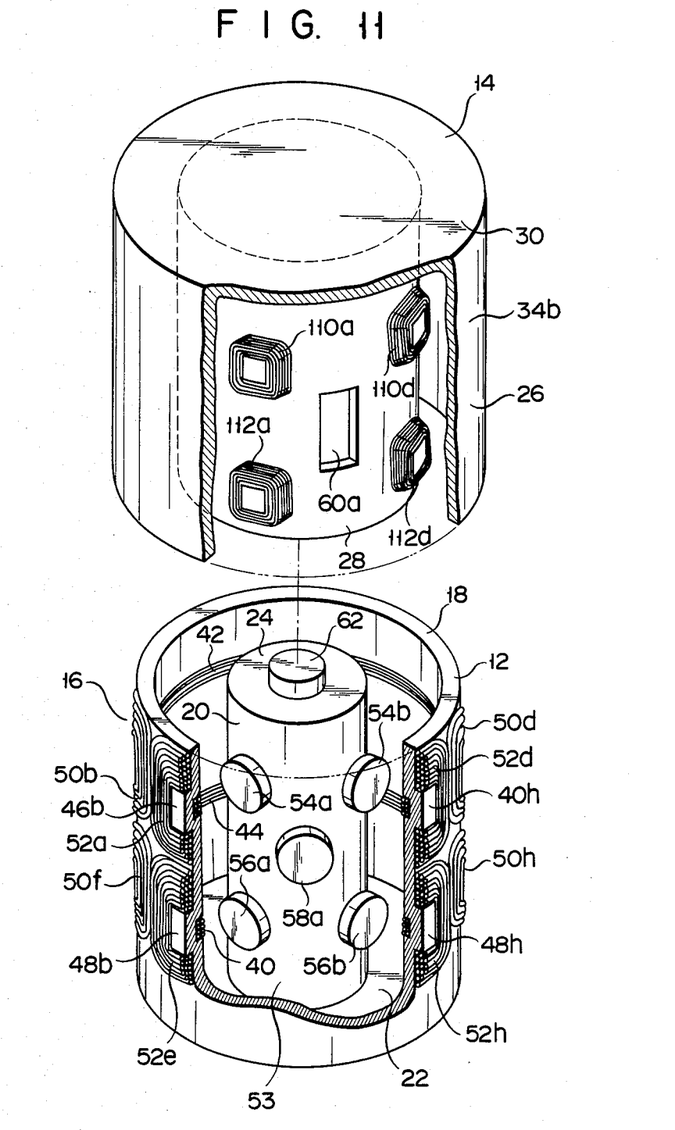
FIG. 11 is an exploded perspective view showing a fourth embodiment of the positioning device according to the invention.

FIG. 11 shows a fourth embodiment of the positioning device. This embodiment is different from the first embodiment in that electromagnets 110a to 110d and 112a to 112d are used in stead of the permanent magnets 34a to 34d and permanent magnets 36a to 36d.

While in the above embodiments the stationary member 12 is surrounded by the floating member 14, it is possible to have the floating member 14 surrounded by the stationary member 12. Further, the twofold was structure of the stationary member 12 and floating member 14 described above is by no means limitative, and it is possible to adopt more than twofold wall structure.

What is claimed is:

1. A magnetic suspension positioning device comprising:

a stationary member made of a non-magnetic material and made in the form of an outer cylinder and an inner cylinder provided coaxially within said outer cylinder;

a movable member formed of a high magnetically permeable material and formed in the shape of an inner and outer cylinder wherein said inner cylinder is hollow and positioned in a non-contacting manner between the inner and outer cylinder of said stationary member and wherein said outer cylinder of said movable member is positioned coaxially with said inner cylinder of said movable member and is surrounding the outer cylinder of said stationary member;

detecting means for detecting the relative position of said movable member with respect to said stationary member and for producing a signal representative of detected relative position;

magnetic force generating means for generating magnetic forces comprising:

a plurality of ferro-magnetic elements arranged at a uniform circumferential spacing on outer peripherey of the inner cylinder of said movable member;

a plurality of second ferro-magnetic elements provided at a uniform circumferential spacing on the outer periphery of the inner cylinder of said movable member and at predetermined distance from and with the same circumferential phase as first ferro-magnetic elements; wherein said first and second ferro-magnetic elements support said movable member in a non-contact state with said stationary member; and driving means secured to said stationary member for generating a drive force for moving and positioning said movable member relative to said stationary member comprising:

at least one conductive member having a pair of first direction position control coils provided on the inner periphery of the outer cylinder of said stationary member and facing said first and second ferro-magnetic elements of said magnetic force generating means;

applying means for applying an electromagnetic force to said conductive member by flowing current to said conductive member in accordance with a signal from said detecting means.

2. The positioning device according to claim 1, wherein said detecting means includes at least one distance detector for detecting an axial position of said movable member relative to said stationary member.

3. The positioning device according to claim 2, wherein the distance detector is an eddy current type sensor.

4. The positioning device according to claim 1, wherein said driving means further comprises a second conductive member having a plurality of second position control coils provided on outer periphery of the outer cylinder of said stationary member and having axially extending portions facing the first and second ferro-magnetic elements.

5. The positioning device according to claim 4, wherein said detecting means includes at least one pair of distance detectors provided on the outer periphery of the inner cylinder of said stationary member and circumferentially spaced apart by 90 degrees for detecting radial position of said movable member relative to said stationary member through measurement of distance between the inner cylinder of said stationary member and the inner cylinder of said movable member.

6. The positioning device according to claim 5, wherein said detecting means includes, in addition to one pair of distance detectors, another pair of distance detectors axially spaced apart from said first-mentioned distance detectors.

7. The positioning device according to claim 6, wherein said distance detectors are an eddy current type sensor.

8. The positioning device according to claim 5, wherein said detecting means includes third direction position detection means for detecting the circumferential direction of said movable member relative to said stationary member.

9. The positioning device according to claim 8, wherein the third direction position detection means includes a pair of axial slots formed in said inner cylinder of said movable member at diametrically opposite positions and a pair of eddy current sensors secured to the outer periphery of the inner cylinder of said stationary member such that they face the slots for detecting a variation in the area of said slots facing them.

10. The positioning device according to claim 1, wherein said magnetic force generating means includes said plurality of ferro-magnetic elements provided at a uniform circumferential spacing on the outer periphery of the inner cylinder of said movable member and a plurality of third magnet ferro-magnetic elements provided at a uniform circumferential spacing on the outer periphery of said inner cylinder of said movable member such that they are positioned between said first and second ferro-magnetic elements and have the said circumferential phase to said first and second magnet ferro-magnetic elements.

11. The positioning device according to claim 10, wherein said driving means includes as the conductive member a first direction position control coils provided on the inner periphery of said outer cylinder of said stationary member and facing said third magnet ferro-magnetic elements.

12. The positioning device according to claim 1, wherein said magnetic force generating means includes third magnet ferro-magnetic elements provided on the inner periphery of said outer cylinder of said movable member and facing the first and second magnet ferro-magnetic elements.

* * * * *